US008520843B2

(12) United States Patent
Disch et al.

(10) Patent No.: US 8,520,843 B2
(45) Date of Patent: Aug. 27, 2013

(54) METHOD AND APPARATUS FOR ENCRYPTING A DISCRETE SIGNAL, AND METHOD AND APPARATUS FOR DECRYPTING

(75) Inventors: Sascha Disch, Erlangen (DE); Johannes Hilpert, Nuremberg (DE); Manfred Lutzky, Nuremberg (DE); Marc Gayer, Erlangen (DE); Reinfried Bartholomaeus, Erlangen (DE)

(73) Assignee: Fraunhofer-Gesellscaft zur Foerderung der Angewandten Forschung E.V., Munich (DE)

( * ) Notice: Subject to any disclaimer, the term of this patent is extended or adjusted under 35 U.S.C. 154(b) by 2357 days.

(21) Appl. No.: 10/486,304

(22) PCT Filed: Aug. 2, 2002

(86) PCT No.: PCT/EP02/08661

§ 371 (c)(1),
(2), (4) Date: Feb. 5, 2004

(87) PCT Pub. No.: WO03/015328

PCT Pub. Date: Feb. 20, 2003

(65) Prior Publication Data

US 2004/0196971 A1 Oct. 7, 2004

(30) Foreign Application Priority Data

Aug. 7, 2001 (DE) .................................. 101 38 650

(51) Int. Cl.
*H04L 29/06* (2006.01)

(52) U.S. Cl.
USPC .................................. 380/36; 380/38; 380/40

(58) Field of Classification Search
USPC .................................... 380/36, 37, 38, 40, 42
See application file for complete search history.

(56) References Cited

U.S. PATENT DOCUMENTS 3,773,977 A * 11/1973 Guanella ......................... 380/36
3,970,790 A * 7/1976 Guanella ......................... 380/36

(Continued)

FOREIGN PATENT DOCUMENTS

| | | |
|---|---|---|
| CH | 558993 | 3/1973 |
| EP | 633 703 | 1/1995 |

(Continued)

OTHER PUBLICATIONS

Franaszek, P. A.; Digital Speech Scrambler; IBM.

(Continued)

*Primary Examiner* — David Garcia Cervetti
(74) *Attorney, Agent, or Firm* — Michael A. Glenn; Perkins Coie LLP

(57) ABSTRACT

In an inventive method for encrypting a discrete signal consisting of successive samples the successive samples are subdivided into successive time blocks, and the successive time blocks are then encoded into encoded data blocks having a predetermined order. Subsequently, the predetermined order of the encoded data blocks is altered in accordance with a predetermined interchange specification. The underlying findings are that a very high level of security of the encryption may be achieved by introducing temporal discontinuity, and that the occurrence of errors in unauthorized processing of signals encoded in such a manner maybe prevented, and the compatibility with standard codings may be ensured by performing the alteration of the chronological order in accordance with a coding of the discrete signal, i.e. with regard to encoded data blocks into which an encoder encodes the discrete signal.

25 Claims, 4 Drawing Sheets

(56) References Cited

U.S. PATENT DOCUMENTS

| | | | | |
|---|---|---|---|---|
| 3,978,288 | A * | 8/1976 | Bruckner et al. | 380/253 |
| 4,232,194 | A * | 11/1980 | Adams | 380/28 |
| 4,278,840 | A * | 7/1981 | Morgan et al. | 380/41 |
| 4,393,276 | A * | 7/1983 | Steele | 380/28 |
| 4,443,660 | A * | 4/1984 | DeLong | 380/36 |
| 4,600,941 | A * | 7/1986 | Sakamoto et al. | 380/36 |
| 4,612,414 | A * | 9/1986 | Juang | 380/38 |
| 4,747,137 | A * | 5/1988 | Matsunaga | 380/276 |
| 4,773,092 | A * | 9/1988 | Huang | 380/276 |
| 5,095,525 | A * | 3/1992 | Almgren et al. | 711/202 |
| 5,303,302 | A * | 4/1994 | Burrows | 713/161 |
| 5,339,108 | A * | 8/1994 | Coleman et al. | 375/240.2 |
| 5,436,940 | A * | 7/1995 | Nguyen | 375/240 |
| 5,717,819 | A * | 2/1998 | Emeott et al. | 704/221 |
| 5,799,088 | A * | 8/1998 | Raike | 380/30 |
| 5,825,425 | A * | 10/1998 | Kazui et al. | 375/240.24 |
| 5,991,308 | A * | 11/1999 | Fuhrmann et al. | 370/395.53 |
| 6,081,784 | A * | 6/2000 | Tsutsui | 704/501 |
| 6,084,966 | A * | 7/2000 | Maebara et al. | 380/43 |
| 6,134,631 | A * | 10/2000 | Jennings, III | 711/117 |
| 6,163,576 | A * | 12/2000 | Lempel | 375/240.24 |
| 6,226,608 | B1 * | 5/2001 | Fielder et al. | 704/229 |
| 6,266,418 | B1 * | 7/2001 | Carter et al. | 380/257 |
| 6,278,783 | B1 * | 8/2001 | Kocher et al. | 380/277 |
| 6,301,268 | B1 * | 10/2001 | Laroia et al. | 370/481 |
| 6,307,940 | B1 * | 10/2001 | Yamamoto et al. | 380/277 |
| 6,356,545 | B1 * | 3/2002 | Vargo et al. | 370/355 |
| 6,430,222 | B1 * | 8/2002 | Okada | 375/240.03 |
| 6,445,797 | B1 * | 9/2002 | McGough | 380/285 |
| 6,507,672 | B1 * | 1/2003 | Watkins et al. | 382/232 |
| 6,512,758 | B1 * | 1/2003 | Sato et al. | 370/344 |
| 6,642,885 | B2 * | 11/2003 | Lobo | 342/357.63 |
| 6,643,729 | B2 * | 11/2003 | Sasaki et al. | 711/4 |
| 6,650,659 | B1 * | 11/2003 | Hamada et al. | 370/487 |
| 6,810,273 | B1 * | 10/2004 | Mattila et al. | 455/570 |
| 6,963,860 | B1 * | 11/2005 | Tsutsui et al. | 705/52 |
| 6,985,722 | B1 * | 1/2006 | Snelgrove et al. | 455/420 |
| 7,016,493 | B2 * | 3/2006 | Henson et al. | 380/44 |
| 7,047,196 | B2 * | 5/2006 | Calderone et al. | 704/270.1 |
| 7,047,222 | B1 * | 5/2006 | Bush | 705/64 |
| 7,050,495 | B2 * | 5/2006 | Mihara et al. | 375/240.04 |
| 7,171,246 | B2 * | 1/2007 | Mattila et al. | 455/570 |
| 7,289,951 | B1 * | 10/2007 | Ojanperaa | 704/207 |
| 7,391,714 | B2 * | 6/2008 | Blasco Claret et al. | 370/208 |
| 7,675,972 | B1 * | 3/2010 | Laksono et al. | 375/240.12 |
| 2001/0009604 | A1 * | 7/2001 | Ando et al. | 386/95 |
| 2001/0009605 | A1 * | 7/2001 | Ando et al. | 386/95 |
| 2001/0010755 | A1 * | 8/2001 | Ando et al. | 386/69 |
| 2001/0012443 | A1 * | 8/2001 | Ando et al. | 386/98 |
| 2001/0014201 | A1 * | 8/2001 | Ando et al. | 386/40 |
| 2001/0053220 | A1 * | 12/2001 | Kocher et al. | 380/29 |
| 2002/0002675 | A1 * | 1/2002 | Bush | 713/160 |
| 2002/0009000 | A1 * | 1/2002 | Goldberg et al. | 365/200 |
| 2002/0037103 | A1 * | 3/2002 | Hong et al. | 382/173 |
| 2002/0076049 | A1 * | 6/2002 | Boykin et al. | 380/211 |
| 2002/0122484 | A1 * | 9/2002 | Mihara et al. | 375/240.04 |
| 2002/0173967 | A1 * | 11/2002 | Law et al. | 704/500 |
| 2003/0095498 | A1 * | 5/2003 | Sato et al. | 370/208 |
| 2004/0030364 | A1 * | 2/2004 | Bange et al. | 607/59 |
| 2005/0027520 | A1 * | 2/2005 | Mattila et al. | 704/228 |
| 2006/0045364 | A1 * | 3/2006 | Mihara et al. | 382/232 |
| 2006/0142821 | A1 * | 6/2006 | Bange et al. | 607/60 |
| 2007/0211786 | A1 * | 9/2007 | Shattil | 375/141 |

FOREIGN PATENT DOCUMENTS

| | | |
|---|---|---|
| EP | 920 209 | 6/1999 |
| GB | 1458698 | 12/1976 |
| WO | WO 99/51279 | 10/1999 |
| WO | WO 00/51279 | 8/2000 |

OTHER PUBLICATIONS

Goldburg, B. et al.; A Secure Analog Speech Scrambler Using the Discrete Cosine Transform.

Franaszek, P. Digital Speech Scrambler. IBM Technical Disclosure Bulletin. vol. 23. No. 1. Jun. 1980.

* cited by examiner

METHOD AND APPARATUS FOR ENCRYPTING A DISCRETE SIGNAL, AND METHOD AND APPARATUS FOR DECRYPTING

BACKGROUND OF THE INVENTION

1. Field of the Invention

The present invention relates to encrypting discrete signals, such as to encrypting voice information, and to decrypting accordingly.

2. Description of Prior Art

In the use, transmission, administration and archiving of audio material it is often desirable to protect the respective contents from unauthorized access. In particular in the field of voice recording there is a necessity to prevent unauthorized playback or clandestine interception during the transmission. At the same time, however, the data format used is to remain valid so that the appliances used for playback do not transition to error conditions even in the event of unauthorized access. This applies particularly to compressing data formats such as data formats in accordance with standards MPEG2 Layer 3 and MPEG2/4 AAC (AAC=Advanced Audio Coding).

In audio applications there is the added aspect that the encrypted signals must not do any damage to the interception equipment in the event of intercepting without decryption. The encrypted signals should therefore be encrypted such that they do not create any crackling or rustling or other extreme dynamics discontinuity when played back without being decrypted. Whereas when encrypting music data it is often sufficient to limit the quality of unauthorized playback to a large extent, it is requested in particular, for voice contents, that in the event of unauthorized use, the playback quality of the data encrypted should no longer allow the voice information, which may be, e.g., interviews, reports etc., to be intelligible.

Patent application WO 99/51279 entitled "Vorrichtung und Verfahren zum Erzeugen eines verschlüsselten Audio-und/oder Videostroms" (apparatus and method for creating an encrypted audio and/or video stream) whose applicant is also Fraunhofer-Gesellschaft, describes a method of scrambling encoded audio data based on permuting lines in a frequency range. This method allows making music signals largely unrecognizable. With voice contents, however, the exact spectral composition of the signal is of little importance for its intelligibility, so that the content of the spoken words and/or the voice information remains intelligible even though the voice of a speaker is alienated to a large extent.

SUMMARY OF THE INVENTION

It is the object of the present invention to provide a method and an apparatus for encrypting a discrete signal, and a method and an apparatus for decrypting accordingly, so that the encryption is as safe as possible, on the one hand, and does not give rise to errors in the event of unauthorized processing and is compatible with previous codings, on the other hand.

In accordance with a first aspect, the invention provides a method for encrypting a discrete signal consisting of successive samples, the method including the following steps: subdividing the successive samples into successive time blocks; coding the successive time blocks into encoded data blocks having a predetermined order; and altering the predetermined order of the encoded data blocks in accordance with a predetermined interchange specification.

In accordance with a second aspect, the invention provides an apparatus for encrypting a discrete signal consisting of successive samples, having: means for subdividing the successive samples into successive time blocks; means for coding the successive time blocks into encoded data blocks having a predetermined order; and means for altering the predetermined order of the encoded data blocks in accordance with a predetermined interchange specification.

In accordance with a third aspect, the invention provides a method for decrypting an encrypted signal having a plurality of encoded data blocks in an order and corresponding, in an encrypted form, to a discrete signal consisting of successive samples, the method including the following steps: altering the order of the encoded data blocks in accordance with a predetermined interchange specification; decoding the encoded data blocks in the altered order into successive time blocks having a predetermined order; forming the successive samples from the successive time blocks.

In accordance with a fourth aspect, the invention provides an apparatus for decrypting an encrypted signal having a plurality of encoded data blocks in an order and corresponding, in an encrypted form, to a discrete signal consisting of successive samples, having: means for altering the order of the encoded data blocks in accordance with a predetermined interchange specification; means for decoding the encoded data blocks in the altered order into successive time blocks having a predetermined order; means for forming the successive samples from the successive time blocks.

The present invention is based on the findings that a very high level of security of the encryption may be achieved by introducing temporal discontinuity, and that the occurrence of errors in unauthorized processing of signals encoded in such a manner maybe prevented, and the compatibility with standard codings may be ensured by performing the alteration of the chronological order after coding the discrete signal, i.e. with regard to encoded data blocks into which an encoder encodes the discrete signal. In this manner it is prevented, on the one hand, that a decoder receiving the encrypted signal enters into undefined states since in the encryption the temporal discontinuity is created in units of encoded data blocks. On the other hand, it is prevented that in the interaction with any coding process desired, such as a compressing coding process, the underlying temporal assumptions, such as the temporal and spectral masking, remain valid in the event of psycho-acoustic audio processes and that the inventive encryption is thus compatible with such codings, and that the implementation of the inventive encryption is simplified.

With an encryption in accordance with the present invention, the successive samples of a discrete signal are subdivided into successive time blocks which are then coded into encoded data blocks having a predetermined order. Subsequently, the predetermined order of the encoded data blocks is altered in accordance with a predetermined interchange specification.

With performing decryptions in accordance with the present invention, the order of the encoded data blocks of an encrypted signal which corresponds, in an encrypted form, to a discrete signal consisting of successive samples, is altered in accordance with a predetermined interchange specification and/or an inverse interchange specification whereupon the encoded data blocks are decoded, in an altered order, into successive time blocks having a predetermined order. Thereby the successive samples of the discrete signal are created from the successive time blocks.

In accordance with an embodiment of the present invention, the alteration of the predetermined order of the encoded data blocks is achieved, in the encryption, by permuting a predetermined number of successive data blocks of the encoded data blocks, a permutation vector being created as the interchange specification to this end. The permutation may be performed with regard to successive groups of encoded data blocks having the same size and/or length. A different permutation vector may be created and used for each permutation group. The creation of the permutation vectors occurs in a predetermined manner in the decoding, a correct decryption being ensured by creating and using, in the decryption, appropriate inverse permutation vectors for re-permuting the groups of encoded data blocks.

BRIEF DESCRIPTION OF THE DRAWINGS

Preferred embodiments of the present invention will be explained in more detail below with reference to the accompanying Fig., wherein.

DESCRIPTION OF PREFERRED EMBODIMENTS

Before explaining the present invention in more detail below with reference to FIGS. 1-4, it shall be pointed out that even though the description below relates to the encryption of audio signals, the present invention is applicable also to other discrete signals, such as to the encryption of image and video signals.

Figure 1:
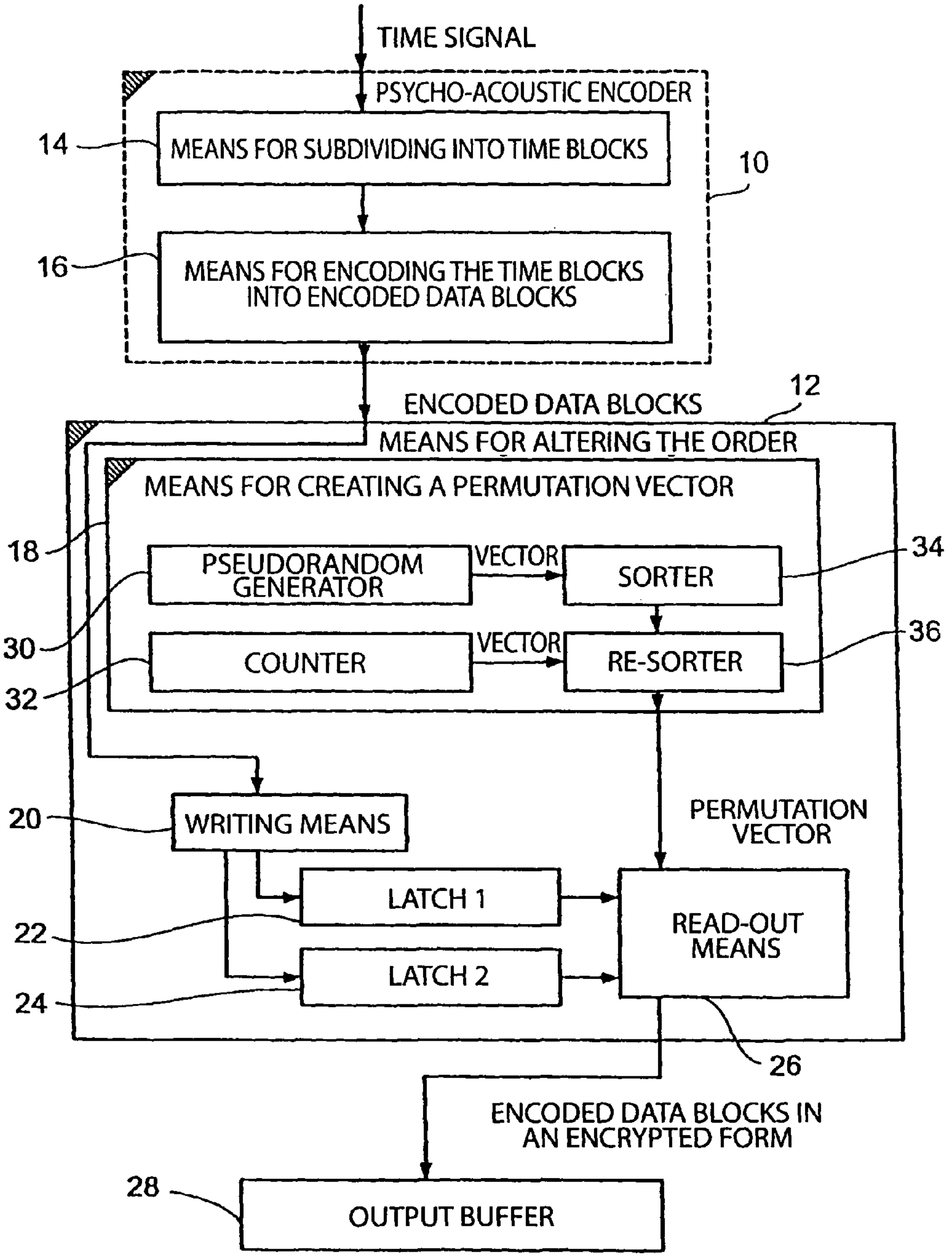
FIG. 1 shows a diagram of an encryption device in accordance with an embodiment of the present invention.

FIG. 1 depicts an encryption device in accordance with an embodiment of the present invention which converts a discrete time signal and/or an audio signal into encoded data blocks in an encrypted form. The apparatus of FIG. 1 includes essentially a psycho-acoustic encoder 10 receiving the time signal and converting and/or coding it into encoded data blocks, and means 12 for altering the order of the encoded data blocks.

The psycho-acoustic encoder 10 includes means 14 for dividing the successive discrete samples making up the time signal into time blocks, and means 16 for coding the time blocks into encoded data blocks.

Means 12 for altering the order include means 18 for producing a permutation vector, writing means 20, a first latch 22, a second latch 24 and read-out means 26. An input of writing means 20 is connected to an output of the psycho-acoustic encoder 10 and/or means 16 for coding, whereas two outputs of same are connected to inputs of the first and second latches 22 and 24, respectively. An output of means 18 for producing a permutation vector is connected to an input of read-out means 26 so as to output a permutation vector to same, the read-out means comprising to further inputs connected to the outputs of latches 22 and 24. Readout means 26 are connected, at an output, to an output buffer 28 in order to output encoded data blocks in an encrypted form to same.

After having described above the structure of the encryption device of FIG. 1, a description of the mode of operation of same will be given below.

The time signal is a discrete audio signal consisting of successive samples. The psycho-acoustic encoder 10 is based, for example, on an AAC standard coding process. Means 14 subdivide the successive samples in time blocks, for example, having a number of successive samples, the number equaling a power of 2. For handling aliasing effects, provisions may be made for a subdivision in mutually overlapping time blocks, so that each sample is assigned to two time blocks as is the case, for example in AAC coding.

Means 16 for coding the time blocks into encoded data blocks receive the time blocks from means 14 in a chronological order and then encode same. A time block may be encoded either individually, or in an isolated manner, on a time-block by time-block basis, or as a function of previous and subsequent time blocks in order to allow for psycho-acoustic models, such as temporal and spectral masking, for example. Means 16 for coding the time blocks outputs the encoded data blocks to writing means 20 in a predetermined order depending on the coding process. The data blocks may all have the same length or may have different lengths, such as, for example, in the case where the data blocks have a structure in conformity with MPEG2/4 AAC.

Writing means 20 receive the encoded data blocks and write the encoded data blocks into a current one of latches 22 and 24 one after the other, the latches cooperating to act as an alternating buffer, as will be described below. The size of latches 22 and 24 is sufficient for storing N encoded data blocks, N being an integer larger than 1 (N>1). Writing means 20 describe the current one of latches 22 and 24 in the order in which the encoded data blocks are transmitted from means 16 until there are N encoded data blocks in the current one of latches 22 and 24. If the current one of latches 22 and 24 is full, i.e. comprises N stored encoded data blocks, read-out means 26 read out latch 22 or 24 having just been filled, whereas writing means 20 write the encoded data blocks from means 16 to the other one of the two latches 22 or 24 in the order of their reception.

Read-out means 26 read latch 22 or 24, whichever was the last one to be fully written to, in a different order than used for writing to same. Specifically, read-out means 26 read the respective latch 22 or 24 in a permuted order specified by a permutation vector of size N which is created and delivered by means 18 for producing a permutation vector as will be described below. By means of the permuted readout, the order of the N encoded data blocks is altered in accordance with an interchange specification established by the permutation vector. The encoded data blocks read out in the permutated order combine to form a permutation group of encoded data blocks output by read-out means 26 to the output buffer 28 connected to a computer interface (not shown), for example.

Means 18 create the N-sized permutation vector anew for each permutation group, the N-sized permutation vector establishing the interchange specification, on the basis of which the encoded data blocks of a permutation group are permuted. The creation of a permutation vector is based on N pseudorandom numbers created by the pseudorandom number generator 30. For creating each permutation vector of the length N, the pseudorandom number generator 30 successively generates N pseudorandom numbers and outputs same to the sorter 34, the counter 32 incrementing an counter value and outputting same to the re-sorter 36 in the output of each pseudorandom number, the counter 32 starting with a value of 0 in order to output a value of 1 with the first pseudorandom number. In this manner, the pseudorandom numbers output by the pseudorandom number generator 30 are numbered in parallel with their generation and/or are provided with indexes in the order of their generation. The pseudorandom numbers generated by the pseudorandom number generator 30 combine to form a random number vector, or a random number array, of N pseudorandom numbers, whereas the numbers generated by counter 32 form an index vector, or an index array, consisting of ascending numbers of 1 to N. The sorter 34 receives the random number vector and sorts same using a suitable sorting method, for example in an ascending order. Sorter 34 is coupled to re-sorter 36 to allow the re-sorter 36 to re-sort the index vector received from counter 32 in parallel with sorting the random number vector. The re-sorted, or permuted, index array generated by re-sorter 36 represents the interchange specification for the N encoded data blocks which are next to be read by the read-out means, and will be output as a permutation vector to read-out means 26 by re-sorter 36, the read-out means using same, as has been described above, for defining the read-out order with regard to the respective latch 22 or 24.

Once read-out means 26 have read the N encoded data blocks from the one latch 22 or 24 and once, at the same time, writing means have filled the other latch with the next-in-line N encoded data blocks from encoder 10, writing means 20 and read-out means 26 change over to the other latch 22 or 24, respectively, the read-out process being performed with regard to the new encoded data blocks written to the alternating buffer, which data blocks are subsequently output to the output buffer in a permuted order. On the whole, an encrypted signal of encoded data blocks in a permuted order is yielded at the input and output of the output buffer, the signal preventing, in the event of unauthorized processing without decryption and in the case of voice, the voice information from being intelligible, as will be described in more detail with reference to FIGS. 3 and 4.

A decryption device in accordance with an embodiment of the present invention will be explained below with reference to FIG. 2. The decryption device of FIG. 2 is provided for reconverting the data blocks of the encryption device of FIG. 1, which data blocks are output in an encrypted form, to a time signal, and to do this in a lossy or loss-free manner depending on the coding used.

Figure 2:
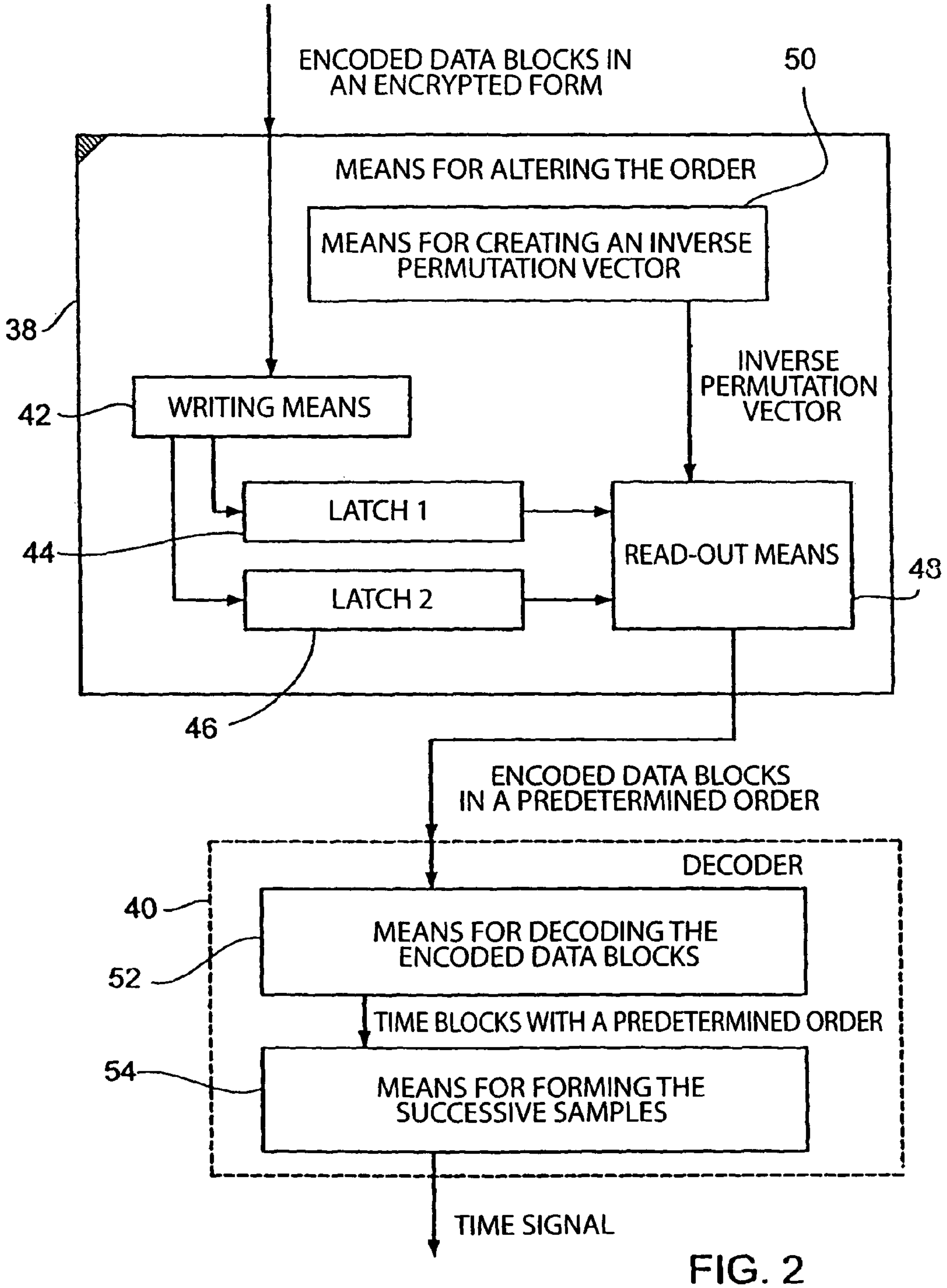
FIG. 2 shows a block diagram of a decryption device in accordance with an embodiment of the present invention.

The device of FIG. 2 includes means 38 for altering the order of the encoded data blocks received which represent the encoded signal, as well as a decoder 40 connected to means 38 and decoding the encoded data blocks.

Means 38 comprise an arrangement similar to that of means 12 of the encryption device of FIG. 1, and consist of writing means 42, a latch 1 44, a latch 2 46, read-out means 48 and means 50 creating an inverse permutation vector which have a structure similar to that of means 18 of the encryption device of FIG. 1 and are therefore not shown in more detail in FIG. 2 for the sake of clarity. Writing means 42 receive, at an input, the encoded data blocks present in the encrypted form, and are connected, at two outputs, to an input of latch 44 and latch 46, respectively. The read-out means include three inputs, one of which is connected to an output of means 50 for producing an inverse permutation vector, and the other two of which are connected to an output of latches 44 and 46, respectively. An output of read-out means 48 is connected to decoder 40 so as to output the decoded data blocks in a predetermined order, i.e. in the order provided for the decoding in accordance with the respective coding process.

Decoder 40 includes means 52 for decoding the encoded data blocks output by read-out means 48 as well as means 54 downstream of means 52, for forming the successive samples, means 54 outputting the time signal to a digital-to-analog converter (not shown) or the like, for example.

After having described above the structure of the decryption device of FIG. 2, the mode of operation of same will be described below.

Writing means 42 receive the encoded data blocks present in an encrypted form, and output same, in the order in which they have been transmitted, to a current one of latches 44 and 46, which co-operate as an alternating buffer as in the encryption device of FIG. 1. While writing means 42 fill one of the two latches 44 and 46 one by one with N encoded data blocks, read-out means 48 read out the other latch. While the filling of a latch with the encoded data blocks is performed in the order of transmission, reading out of the other latch is performed in a permuted order depending on the inverse permutation vector generated by means 50. Herein, “inverse permutation vector” means that the interchange specification generated by the inverse permutation vector reverses the interchanges performed at a respective interchange and/or permutation group of N encoded data blocks by the decryption device of FIG. 1.

Means 50 create the inverse permutation vectors per read-out operation by means of a same arrangement of means, for example, as is shown for means 18 in FIG. 1, but means 50 create an inverse permutation vector from the permutation vector as is created by means 18, by using suitable means, for example by applying the interchange specification, established by the permutation vector, to a vector as is output by the counter (see 32 in FIG. 1), i.e. a vector of ordered numbers from 1 to N.

The encoded N data blocks read out by read-out means 48 in a permuted order are fed to means 52 for decoding the encoded data blocks, the latter now being present in the predetermined order necessary for decoding the encoded data blocks in accordance with the coding process underlying the decoder 44, in order to obtain a correct time signal.

Once read-out means 48 have read out the respective latch, and once writing means 42 have completely filled the other latch, the read-out means read out the latch that has just been filled by writing means 42, while writing means 42 write to the latch that has just been read out by read-out means 48.

Means 52 decode the encoded data blocks and output time blocks in a predetermined order. Means 54 receive the time blocks and form the successive samples from same, of which samples the time signal consists, and output same to an analog-to-digital converter (not shown), for example.

After embodiments of encryption and/or decryption devices have been described above, an explicit embodiment will be described below with reference to FIGS. 3 and 4, wherein a discrete signal is encrypted into an encrypted signal by the device of FIG. 1, and wherein said encrypted signal is decrypted by the device of FIG. 2, additional reference being made to FIGS. 1 and 2.

Figure 3:
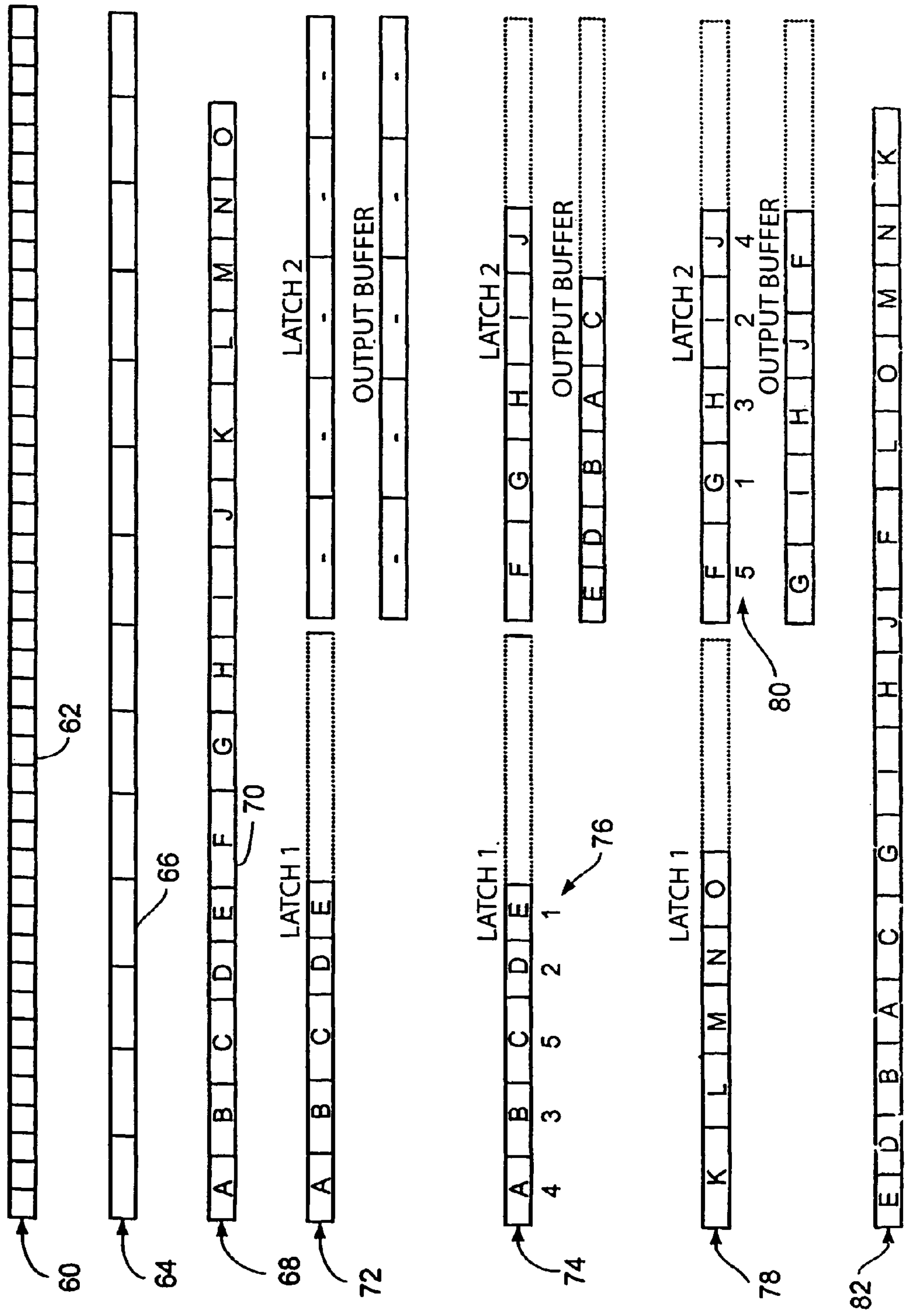
FIG. 3 shows a schematic outline depicting an exemplary embodiment of an encryption.
Figure 4:
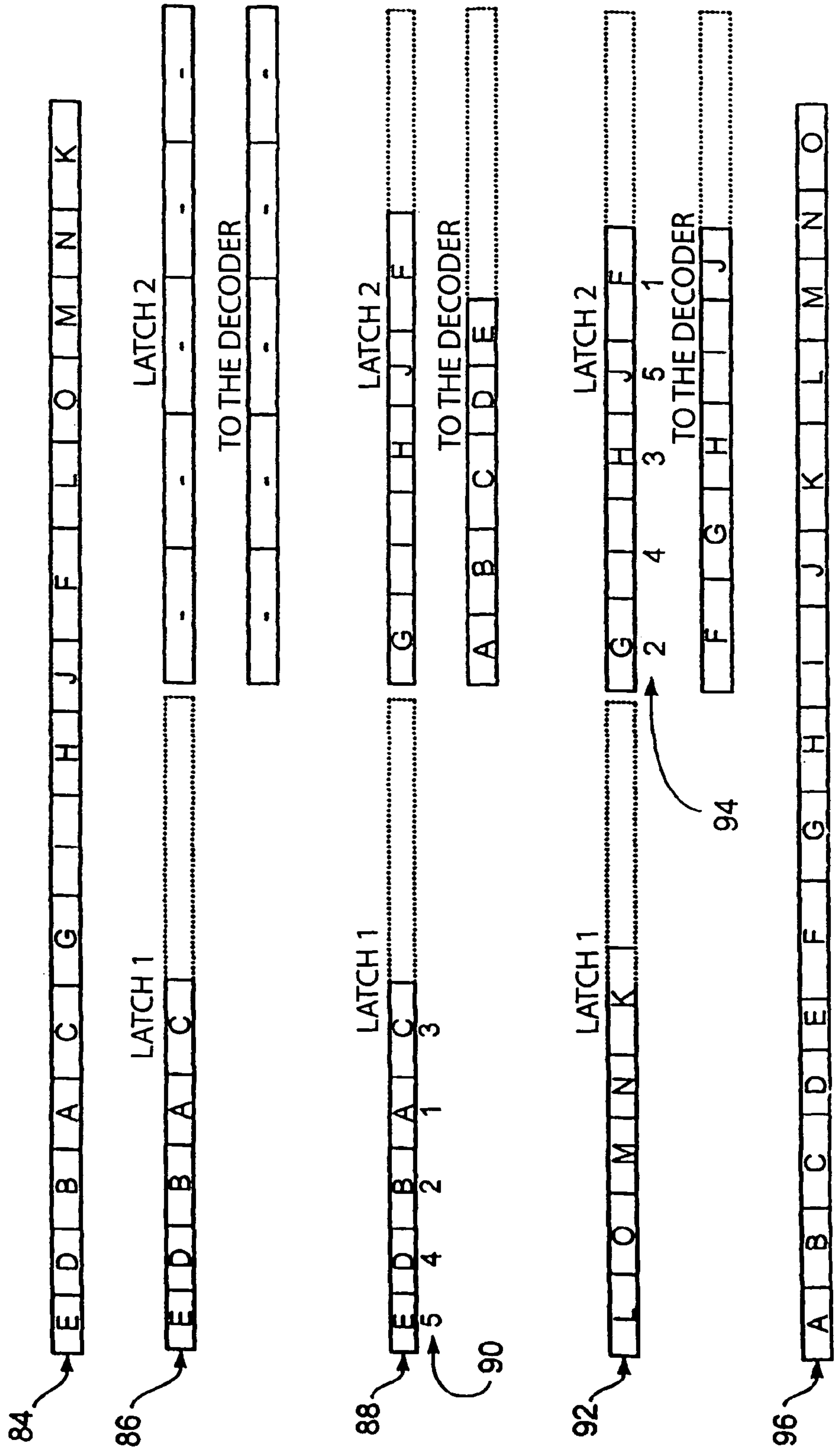
FIG. 4 is a schematic outline depicting an exemplary embodiment of a decryption.

Samples of the time and/or audio signals, time blocks and/or data blocks are represented by means of rectangles in FIGS. 3 and 4, as is indicated in the description. To be able to differentiate between the data blocks, the data blocks are labeled with large letters A-O, respectively.

FIG. 3 schematically represents an encryption process in accordance with the present invention. 60 shows a sequence of samples 62 forming the time signal and/or the discrete signal, as is fed to the encryption device of FIG. 1.

64 shows a sequence of time blocks 66 as are created by means 14 of FIG. 1. As has already been mentioned, every sample may be located in one or several of time blocks 66, and/or the time blocks may mutually overlap so as to eliminate aliasing artefacts.

68 shows a sequence of encoded data blocks A-N present in the predetermined order, as are output by means 16 of FIG. 1. As can be seen, each encoded data block 70 may have a different length and/or size, as is illustrated by the different sizes of the blocks.

72 shows a state such as results for the successive encoded data blocks 70 during the encryption with the encryption device of FIG. 1. In state 72, as well as in the subsequent states of FIG. 3, the contents of latch 1 (22 in FIG. 1), of latch 2 (24 in FIG. 1) and of the output buffer (28 in FIG. 1) are represented for the respective state. 72 represents the state for the exemplary case where the size of the interchange group is set to five in the encryption and/or decryption. The state represented at 72 corresponds to the state as is set in the device of FIG. 1 once the first 5 A-E of data blocks 70 have been written, at 68, to the active and/or current latch, in this case latch 1. The values in latch 2 and in the output buffer, which, for example, may have the same length and/or size as latch 1, depend on previous encoded data blocks and are therefore represented using hyphens. As may be seen, the encoded data blocks A-E have been stored in latch 1 in their predetermined order.

74 represents the state obtained after five further encoded data blocks. The 5 further encoded data blocks F-J have been written to latch 2, while the encoded data blocks stored in latch 1 have been read out into the output buffer. For reading out the encoded data blocks stored in latch 1, the permutation vector as is indicated at 76, i.e. (4,3,5,2,1), has been used. In other words, permutation vector 76 assigns each encoded data block in latch 1 a number between 1 and 5 and/or N indicating the read-out order and/or the position at which that particular encoded data block is to be written to the output buffer, so that the encoded data blocks A-E are present in the order EDBAC in the output buffer.

78 represents the state obtained after 5 more encoded data blocks. As may be seen, the 5 subsequent encoded data blocks K-O have again been written to latch 1, while in the meantime latch 2 has been read out, by means of a permutation vector 80 (5,1,3,2,4), to the output buffer, where the encoded data blocks are yielded in the order GIHJE.

82 represents the flow and/or the sequence of encoded data blocks in an encrypted form, as are input into and/or output from output buffer 28. As may be seen, the encoded data blocks have been scrambled as compared to the predetermined order in which they are usually output due to the coding underlying the encoder 10, which is why, in the event that the audio data are carriers of voice information, this voice information is unintelligible in the event of decoding without decryption. Nevertheless it is prevented, in decoding without decrypting, that the decoder gets into invalid states, since the temporal discontinuity is defined in units of encoded data blocks.

If the coding underlying the psycho-acoustic decoder is in conformity with the AAC standard, for example, no crackling will occur at the block boundaries if the signal encrypted is decoded by a standard decoder, but rather is the temporal discontinuity expressed as an occurrence of aliasing portions due to the interchanged frames and/or data blocks, since the data blocks are retransformed into the time domain by means of the inverse modified discrete cosine transform (IMDCT), and since there is no more aliasing elimination at the overlap areas of the transformation windows.

If signal 82 is decrypted by a decoder and/or a decryption device in accordance with FIG. 2, i.e. with a corresponding inverse interchange of the input data, the data blocks and/or the data frames are present again in the latch in the correct order and the subsequent decoding may be performed in conformity with the underlying standard. This decryption process will be explained in more detail with regard to the explicit embodiment of FIG. 3 with reference to FIG. 4.

At 84, FIG. 4 shows an example of a sequence of encoded data blocks in an encrypted form, which corresponds, in this case, to that of FIG. 3 at 82. 86 represents a state as is obtained with the decryption device of FIG. 2 once same has received the first five of the encoded data blocks from 84. In state 84 as well as in the subsequent states in FIG. 4, in particular, the content of latch 1 (44 in FIG. 2), the content of latch 2 (46 in FIG. 2), and the sequence of encoded data blocks output from means 38 to encoder 40 are depicted. As can be seen at 86, the decoded data blocks are stored in the current latch, in this case latch 1, in the order in which they are transmitted.

88 depicts the state such as is obtained after five more encoded data blocks FGHIJ. As may be seen, the next five encoded data blocks have been written to latch 2, while the encoded data blocks EDBAC are read out from latch 1 by means of an inverse permutation vector 90 in order to be transmitted to decoder 40 in the order ABCDE, the inverse permutation vector resulting from permutation vector 76 of FIG. 3, which related to the same permutation group, by applying the latter as an interchange specification to a vector (1,2,3,4,5).

92 depicts the state such as results after reading out five more encoded data blocks from the flow of encoded data blocks 84. As can be seen, latch 1 has again been filled with the subsequent encoded data blocks K-O, while the encoded data blocks GHIJF have been read out in latch 2 and have been output to the decoder in a permuted order and/or inversely permuted order FGHIJ. The re-permutation is based on the inverse permutation vector 94 resulting from permutation vector 80 of FIG. 3 by applying the latter to a vector (1,2,3,4,5).

96 finally depicts the flow of successive encoded data blocks as is fed to the decoder. As can be seen, the order in which the encoded data blocks have been output from the encoder of the encryption device, i.e. ABCDEFGHIJK LMN . . . , is restituted, so that decoding may be performed according to standards.

The description given above with reference to FIGS. 1 to 4 related to an encryption based on the interchange of data blocks of the time signal within a block group and/or interchange group. The interchange of blocks in the time domain destroys the temporal modulation of a voice signal such that intelligibility is substantially reduced in the event of a voice signal. An advantage of the above embodiments is the fact that although in the above embodiments a psycho-acoustic compression process is used for coding the time signal, the assumptions underlying this psychoacoustic compression process, such as those relating to temporal and spectral masking, remain valid, since the temporal discontinuity is not created until after the compression, i.e. the chronological order of the data frames already encoded is interchanged. The embodiments described above are, in principle, applicable to all encoded data streams based on a sequential sequence of self-contained data frames which overlap after coding.

With regard to the above-described embodiments, it shall be pointed out in particular that the unintelligibility of the voice of the encrypted signal may be improved by the psycho-acoustic encoder 10 and/or means performing, between the encoder and the means, a frequency domain scrambling in accordance with the patent application WO 99/51279, mentioned in the introduction of the description, in order to alter the order.

After the present invention has been described above with reference to specific embodiments, it shall be pointed out that the present invention may be implemented both in hardware, such as in a form of an ASIC, an integrated circuit or the like, as well in software, such as in a software that may be run on a PC. In addition it shall be pointed out that, although the present invention has been described above with regard to the encryption of audio data and/or voice signals, the present invention may be generally applied to all fields where discrete signals are used and where, under certain circumstances, an coding of same is performed, such as in image and video processing or in data transmission in general. Accordingly, the coding preceding the creation of the temporal discontinuity in the encryption is not limited to psycho-acoustic coding. A JPEG coding with image or video data is also possible, for example. The present invention may generally be implemented with any coding process subdividing successive discrete samples into time blocks and coding same into encoded data blocks, or frames, or directly coding time blocks which already exist.

It shall additionally be pointed out that the exact implementation of the means for producing a permutation vector and of the means for producing the order of the encoded data blocks may vary, particularly, for example, with regard to the length of the interchange group N or the number and size of the latches used.

In addition, the means for producing a permutation vector may be implemented differently than described above. For example, the permutation vector could be the same for all interchange groups, in which case the inverse permutation vector would also be specified. It shall generally be pointed out that it is possible to depart from the principle of the permutation of successive interchange groups, which principle has been used in the previous embodiments, and that the variation in the order may also be carried out in other ways, such as by altering the order with regard to all encoded data blocks, in which case a latching of all encoded data blocks would be required to occur before altering the order in the encryption, and storing of all of the encoded data blocks would be required to occur before altering the order in the decryption.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for encrypting a discrete audio signal consisting of successive samples, the method being implemented in hardware and comprising:
- subdividing the successive samples into successive time blocks;
- block-wisely coding the successive time blocks into encoded data blocks having a predetermined order by transforming each time block from time domain to frequency domain; and
- altering the predetermined order of the encoded data blocks in accordance with a predetermined interchange specification.

2. The method as claimed in claim 1, wherein the step of subdividing the successive samples into successive time blocks is performed such that the successive time blocks mutually overlap each other.

3. An apparatus for encrypting a discrete audio signal consisting of successive samples, the apparatus configured to
- subdivide the successive samples into successive time blocks;
- block-wisely code the successive time blocks into encoded data blocks having a predetermined order by transforming each time block from time domain to frequency domain; and
- alter the predetermined order of the encoded data blocks in accordance with a predetermined interchange specification, the apparatus being
- an integrated circuit configured to perform the sub-division, block-wise coding and alteration.

4. The apparatus as claimed in claim 3, wherein the apparatus is configured to perform, in the block-wise coding, a psycho-acoustic coding.

5. The apparatus as claimed in claim 3, wherein the apparatus is further configured to, in altering the predetermined order,
- permute a predetermined number of successive decoded data blocks in accordance with the predetermined interchange specification.

6. The apparatus as claimed in 5, wherein the means for permuting is adapted to permute several successive groups of successive encoded data blocks, and further comprises:
- an output buffer;
- first and second latches;
- a writer configured to alternately store the successive groups of successive encoded data blocks into one of the first and/or second latches; and
- a reader configured to read out the memory content of the other one of the first and/or second latches in which the alternate storing does not occur, during the alternate storing into the one of the first and/or second latches, and output the memory content to the output buffer in accordance with an order complying with the interchange specification.

7. The apparatus as claimed in claim 6, wherein the interchange specification comprises a different permutation vector for at least two of the groups.

8. The apparatus as claimed in claim 3, wherein the subdivider is configured to perform the subdividing the successive samples into successive time blocks such that the successive time blocks mutually overlap each other.

9. The apparatus as claimed in claim 8, wherein the coder is configured to perform the block-wisely coding
- according to MPEG2 Layer 3 or MPEG2/4 AAC, and/or
- by performing entropy coding the transform of the time blocks from time domain to frequency domain,
- to obtain the encoded data blocks.

10. An apparatus for encrypting a discrete signal consisting of successive samples, comprising
- means for subdividing the successive samples into successive time blocks;
- means for coding the successive time blocks into encoded data blocks having a predetermined order; and
- means for altering the predetermined order of the encoded data blocks in accordance with a predetermined interchange specification,
- wherein the means for altering the predetermined order of the encoded data blocks in accordance with a predetermined interchange specification further comprise:
- means for permuting a predetermined number of successive decoded data blocks in accordance with the predetermined interchange specification,
- wherein the predetermined interchange specification is a permutation vector of a length N, N corresponding to the predetermined number of successive ones of the encoded data blocks, the apparatus further comprising:
- means for producing the permutation vector, comprising:
  - means for successively generating N pseudorandom numbers;
  - means for assigning each of the N pseudorandom numbers a number between 1 and N in accordance with the order of the generation of N pseudorandom numbers; and means for sorting the N pseudorandom numbers;

means for re-sorting the N assigned numbers in parallel with sorting the N pseudorandom numbers in order to obtain the permutation vector.

11. A method for decrypting an encrypted audio signal comprising a plurality of encoded data blocks in an order and corresponding, in an encrypted form, to a discrete signal consisting of successive samples, the method being implemented in hardware and comprising:

altering the order of the encoded data blocks in accordance with a pre-determined interchange specification;

block-wisely decoding the encoded data blocks in the altered order into successive time blocks having a predetermined order by performing, for each encoded data block, a spectral transition from a spectral domain to a time domain;

forming the successive samples from the successive time blocks.

12. The method as claimed in claim 11, wherein the successive time blocks mutually overlap each other within overlap time intervals, and the step of forming the successive samples from the successive time blocks comprises combining the mutually overlapping successive time blocks at the overlap time intervals.

13. An apparatus for decrypting an encrypted audio signal comprising a plurality of encoded data blocks in an order and corresponding, in an encrypted form, to a discrete signal consisting of successive samples, the apparatus being configured to alter the order of the encoded data blocks in accordance with a predetermined interchange specification;

block-wisely decode the encoded data blocks in the altered order into successive time blocks having a predetermined order by performing, for each encoded data block, a spectral transition from a spectral domain to a time domain;

form the successive samples from the successive time blocks, the apparatus being an integrated circuit configured to perform the alteration, the block-wise decoding and the formation.

14. The apparatus as claimed in claim 13, wherein the apparatus is configured to, in block-wise decoding, perform an inverse modified discrete cosine transform.

15. The apparatus as claimed in claim 13, wherein the apparatus is configured to, in altering the order of the encoded data blocks, permute a first predetermined number of successive encoded data blocks in accordance with the predetermined interchange specification.

16. The apparatus as claimed in 15, wherein the means for permuting is adapted to permute several successive groups of successive ones of encoded data blocks, and further comprises:

first and second latches;

a writer configured to alternately store the groups of successive encoded data blocks into one of the first and second latches; and a reader configured to read out the memory content of the other one of the first and second latches in which the alternate storing does not occur during the alternate storing into the other one of the first and second latches, and output the memory content to means for decoding in accordance with an order complying with the interchange specification.

17. The apparatus as claimed in claim 16, wherein the interchange specification comprises a different permutation vector for at least two of the groups.

18. The apparatus as claimed in claim 13, wherein the audio signal contains voice information.

19. The apparatus as claimed in claim 13, wherein the successive time blocks mutually overlap each other within overlap time intervals, and the former is configured to form the successive samples from the successive time blocks by combining the mutually overlapping successive time blocks at the overlap time intervals.

20. The apparatus as claimed in claim 19, wherein the decoder is configured to perform the block-wisely decoding according to MPEG2 Layer 3 or MPEG2/4 AAC, and/or by performing entropy decoding the encoded data blocks to obtain the spectral domain and then performing the spectral transition from the spectral domain to the time domain, to obtain the successive time blocks.

21. An apparatus for decrypting an encrypted signal comprising a plurality of encoded data blocks in an order and corresponding, in an encrypted form, to a discrete signal consisting of successive samples, comprising means for altering the order of the encoded data blocks in accordance with a predetermined interchange specification;

means for decoding the encoded data blocks in the altered order into successive time blocks having a predetermined order; and means for forming the successive samples from the successive time blocks, wherein means for altering the order of the encoded data blocks in accordance with a predetermined interchange specification further comprise:

means for permuting a first predetermined number of successive encoded data blocks in accordance with the predetermined interchange specification, wherein the predetermined interchange specification is a permutation vector of a length N, N corresponding to the predetermined number of successive ones of the encoded data blocks, the apparatus further comprising:

means for producing the permutation vector, comprising:

means for successively generating N pseudorandom numbers;

means for assigning each of the N pseudorandom numbers a number between 1 and N in accordance with the order of the generation of N pseudorandom numbers; and means for sorting the N pseudorandom numbers;

means for re-sorting the N assigned numbers in parallel with sorting the N pseudorandom numbers in order to obtain a permutation vector; and means for applying the permuted vector as a permutation specification to an ordered vector of numbers from 1 to N to obtain the permutation vector.

22. An apparatus for encrypting a discrete signal consisting of successive samples, the apparatus being configured to:

subdivide the successive samples into successive time blocks;

code the successive time blocks into encoded data blocks having a predetermined order;

alter the predetermined order of the encoded data blocks in accordance with a predetermined interchange specification by permuting a predetermined number of successive decoded data blocks in accordance with the predetermined interchange specification, wherein the predetermined interchange specification is a permutation vector of a length N, N corresponding to the predetermined number of successive ones of the encoded data blocks, and produce the permutation vector by successively generating N pseudorandom numbers;

assigning each of the N pseudorandom numbers a number between 1 and N in accordance with the order of the generation of N pseudorandom numbers; and sorting the N pseudorandom numbers;

re-sorting the N assigned numbers in parallel with sorting the N pseudorandom numbers in order to obtain the permutation vector, wherein the apparatus is an integrated circuit configured to perform the sub-division, the coding, the alteration and the production.

23. The apparatus as claimed in claim 22, wherein the sub-divider is configured to perform the subdividing the successive samples into successive time blocks such that the successive time blocks mutually overlap each other.

24. An apparatus for decrypting an encrypted signal comprising a plurality of encoded data blocks in an order and corresponding, in an encrypted form, to a discrete signal consisting of successive samples, the apparatus being configured to:

alter the order of the encoded data blocks in accordance with a predetermined interchange specification;

decode the encoded data blocks in the altered order into successive time blocks having a predetermined order; and form the successive samples from the successive time blocks by permuting a first predetermined number of successive encoded data blocks in accordance with the predetermined interchange specification, wherein the predetermined interchange specification is a permutation vector of a length N, N corresponding to the predetermined number of successive ones of the encoded data blocks; and produce the permutation vector by successively generating N pseudorandom numbers;

assigning each of the N pseudorandom numbers a number between 1 and N in accordance with the order of the generation of N pseudorandom numbers; and sorting the N pseudorandom numbers;

re-sorting the N assigned numbers in parallel with sorting the N pseudorandom numbers in order to obtain a permutation vector; and applying the permuted vector as a permutation specification to an ordered vector of numbers from 1 to N to obtain the permutation vector, wherein the apparatus is an integrated circuit configured to perform the alteration, the decoding, the formation, and the production.

25. The apparatus as claimed in claim 24, wherein the successive time blocks mutually overlap each other within overlap time intervals, and the former is configured to form the successive samples from the successive time blocks by combining the mutually overlapping successive time blocks at the overlap time intervals.

* * * * *

UNITED STATES PATENT AND TRADEMARK OFFICE

CERTIFICATE OF CORRECTION

PATENT NO. : 8,520,843 B2
APPLICATION NO. : 10/486304
DATED : August 27, 2013
INVENTOR(S) : Disch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2478 days.

Signed and Sealed this
Fifteenth Day of September, 2015

Michelle K. Lee
*Director of the United States Patent and Trademark Office*